United States Patent
Focke et al.

[11] Patent Number: 6,151,867
[45] Date of Patent: Nov. 28, 2000

[54] PROCESS AND APPARATUS FOR HANDLING, IN PARTICULAR, SOFT FILM PACKS

[75] Inventors: Heinz Focke, Verden; Hugo Mutschall, Kirchlinteln; Frank Wolter, Hoya, all of Germany

[73] Assignee: Focke & Co. (GmbH & Co.), Verden, Germany

[21] Appl. No.: 09/200,653

[22] Filed: Nov. 25, 1998

[30] Foreign Application Priority Data

Dec. 1, 1997 [DE] Germany .......................... 197 53 019

[51] Int. Cl.⁷ .................................................. B65B 35/58
[52] U.S. Cl. ............................. 53/446; 53/201; 53/544; 198/410; 198/412; 198/377.04; 198/377.08
[58] Field of Search .......................... 53/201, 446, 544; 198/410, 412, 377.01, 377.02, 377.03, 377.04, 377.06, 377.07, 377.08, 377.1

[56] References Cited

U.S. PATENT DOCUMENTS

| | | |
|---|---|---|
| 2,371,888 | 3/1945 | Hermani . |
| 3,563,377 | 2/1971 | Southcott . |
| 3,834,516 | 9/1974 | Reeser . |
| 3,868,009 | 2/1975 | Billi et al. . |
| 3,914,919 | 10/1975 | Boissy et al. . |
| 4,086,744 | 5/1978 | Seragnoli . |
| 4,283,973 | 8/1981 | Spencer . |
| 4,471,865 | 9/1984 | Johnson . |
| 4,483,526 | 11/1984 | Bulka et al. . |
| 4,512,455 | 4/1985 | Thorn et al. . |
| 4,530,694 | 7/1985 | Kobler et al. . |
| 4,555,013 | 11/1985 | Franklin . |
| 4,583,351 | 4/1986 | Fallas . |
| 4,586,598 | 5/1986 | Ehlscheid et al. . |
| 4,648,503 | 3/1987 | Stemmler et al. . |
| 4,798,278 | 1/1989 | Cornacchia . |
| 4,883,163 | 11/1989 | Gamberini et al. . |
| 4,928,809 | 5/1990 | Bozza . |
| 5,090,553 | 2/1992 | Focke . |
| 5,141,388 | 8/1992 | Georgitsis et al. . |
| 5,188,212 | 2/1993 | Munsch . |
| 5,310,041 | 5/1994 | Draghetti . |
| 5,318,165 | 6/1994 | Spatafora et al. . |
| 5,400,574 | 3/1995 | Spatafora . |
| 5,417,037 | 5/1995 | Osti et al. . |
| 5,447,013 | 9/1995 | Boriani et al. . |
| 5,615,762 | 4/1997 | Dyess . |
| 5,647,190 | 7/1997 | Minarelli et al. . |
| 5,660,262 | 8/1997 | Landrum et al. . |
| 5,871,079 | 2/1999 | Nannini et al. . |

FOREIGN PATENT DOCUMENTS

| | | |
|---|---|---|
| 103104A | 3/1984 | European Pat. Off. . |
| 0487841A2 | 6/1992 | European Pat. Off. . |
| 776840A | 6/1997 | European Pat. Off. . |
| 2062683 | 6/1971 | France . |
| 1800258A | 5/1970 | Germany . |
| OS2105962 | 8/1972 | Germany . |
| 3831275A1 | 3/1990 | Germany . |
| 3840297A1 | 5/1990 | Germany . |
| 3906635A1 | 9/1990 | Germany . |
| 3441633C2 | 5/1994 | Germany . |
| 4338810A | 5/1994 | Germany . |
| 8133232 | 5/1996 | Japan . |
| 865077A | 4/1961 | United Kingdom . |
| 1223295A | 2/1971 | United Kingdom . |

*Primary Examiner*—Daniel B. Moon
*Attorney, Agent, or Firm*—Abelman, Frayne & Schwab

[57] ABSTRACT

Process and apparatus for handling (individual) packs (10), namely for packaging the latter in a folding box or the like. The packs (10), which, for production or other reasons, are fed in a specific relative position, to be introduced into the folding box as a pack group (22) in another predetermined relative position. For this purpose, turning stations (27, 49) are installed in the region of the pack conveyor and rotate the packs (10)—depending on requirements—about a horizontal axis and/or about a vertical axis.

21 Claims, 8 Drawing Sheets

PROCESS AND APPARATUS FOR HANDLING, IN PARTICULAR, SOFT FILM PACKS

BACKGROUND OF THE INVENTION

Field of the Invention

The invention relates to a process for handling, in particular packaging, articles, preferably individual packs such as soft film packs, the individual packs being fed on pack conveyors to a collecting or packing station. The invention also relates to an apparatus for handling articles or packs of this type.

In the operation of packaging articles, in particular (individual) packs, in relatively large containers such as folding boxes, there is often a problem with packaging the individual packs in a specific relative position. On the one hand, this may be brought about by the formats of the individual packs as well of the folding box. On the other hand, it may be necessary for a specific side or surface of the individual pack to be presented in a specific relative position. Thus, for example, it may be necessary for labels, text or the like provided in the region of a side surface or side wall of the individual pack to be arranged in an upwardly directed position when the individual packs are positioned in the folding box.

The articles or (individual) packs come from a production apparatus, in particular a packaging machine, and are fed on pack conveyors to a collecting station or a packing station. In the region thereof, a group of individual packs is collected and introduced as a unit into the folding box or the like.

The object of the invention is to take measures which ensure that the articles or individual packs are available in the necessary relative position in the packing station for the purpose of introduction into the folding box or for other handling.

BRIEF SUMMARY OF THE INVENTION

In order to achieve this object, the process according to the invention is characterized in that, during the transportation and/or in the region of the pack conveyors, the (individual) packs or articles are rotated about vertical and/or horizontal axes into a relative position which is correct for the packaging operation.

Accordingly, the invention provides for the alignment of the individual packs during the transportation of the same in the region of the pack conveyor or conveyors.

In one advantageous embodiment of the process, the individual packs are rotated one after the other about a vertical axis—through 90°—in order that they are in the relative position which is necessary for further handling. Furthermore, the individual packs are rotated about a horizontal axis in order that the correct side or side wall of the individual packs is directed upwards.

The apparatus according to the invention for handling the (individual) packs comprises at least one pack conveyor for transporting individual packs which are supplied one after the other, one or more turning stations for in each case one pack being arranged in the region of the pack conveyor. A special feature of the turning stations is that individual packs are each gripped by retaining elements in a frictionally or positively locking manner during the rotary movement. Alternatively, or in addition, the individual packs may be gripped in the region of the turning stations by retaining elements activated by suction air. This allows a correct rotary or turning movement at a high operating speed.

Further details of the invention relate to process steps in the handling of the (individual) packs and to details of the apparatus, in particular of the turning stations.

BRIEF DESCRIPTION OF THE SEVERAL VIEWS OF THE DRAWINGS

An exemplary embodiment of the apparatus is explained in more detail hereinbelow with reference to the drawings, in which.

DETAILED DESCRIPTION OF THE INVENTION

Figure 1:
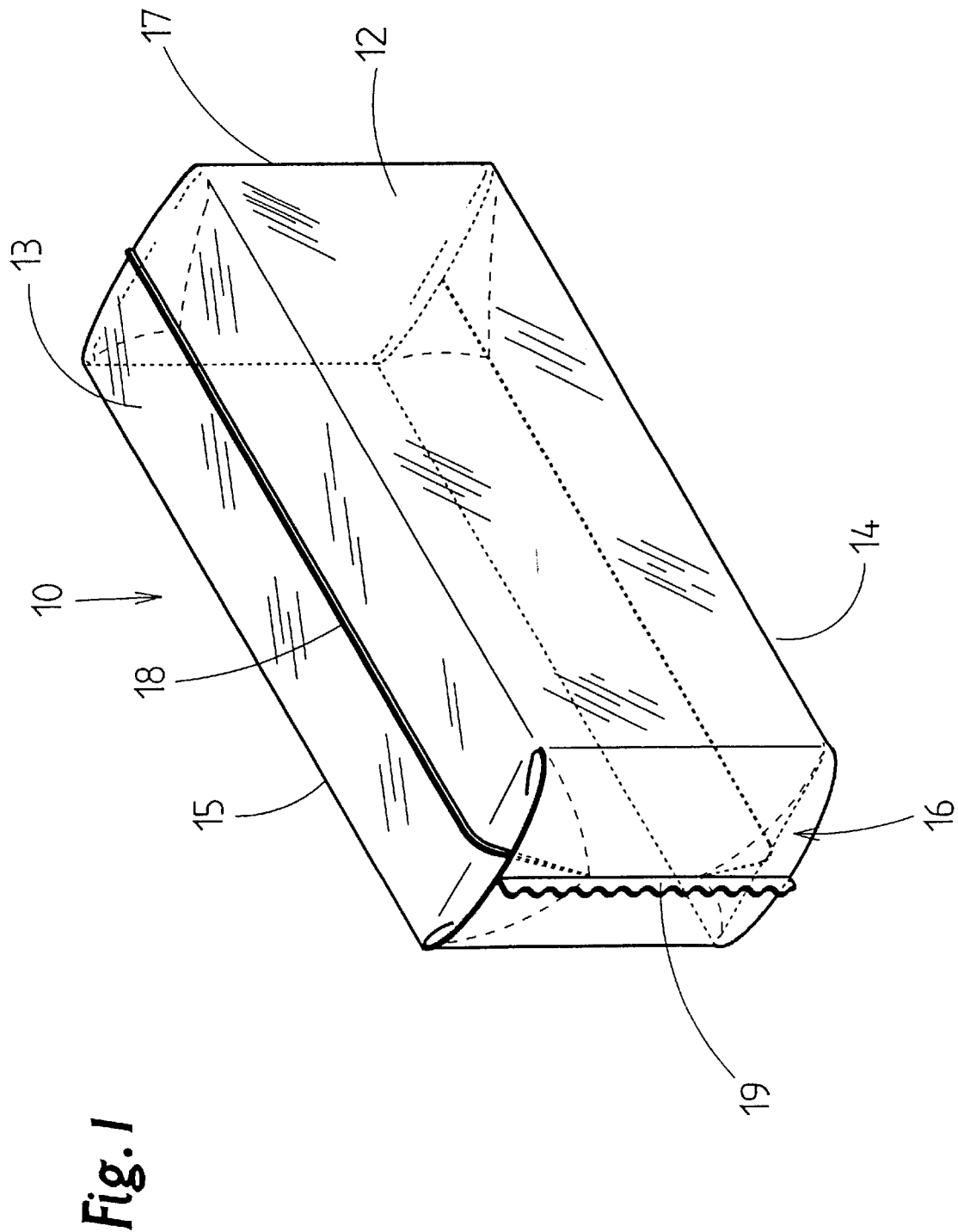
FIG. 1 shows a perspective illustration of a soft film pack as an example of an article which is to be handled.
Figure 2:
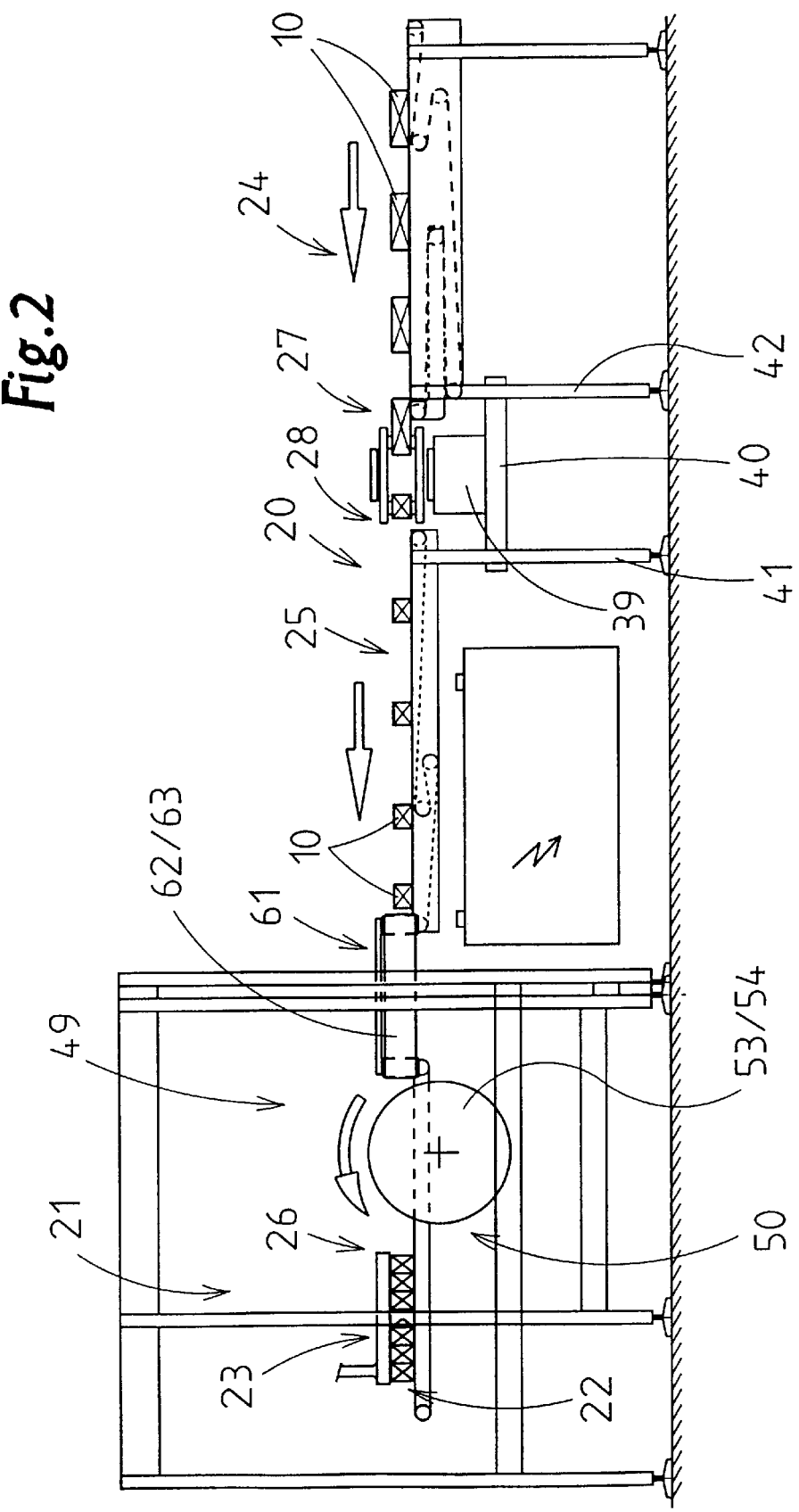
FIG. 2 shows a schematic side view of an apparatus for transporting and turning individual packs.
Figure 3:
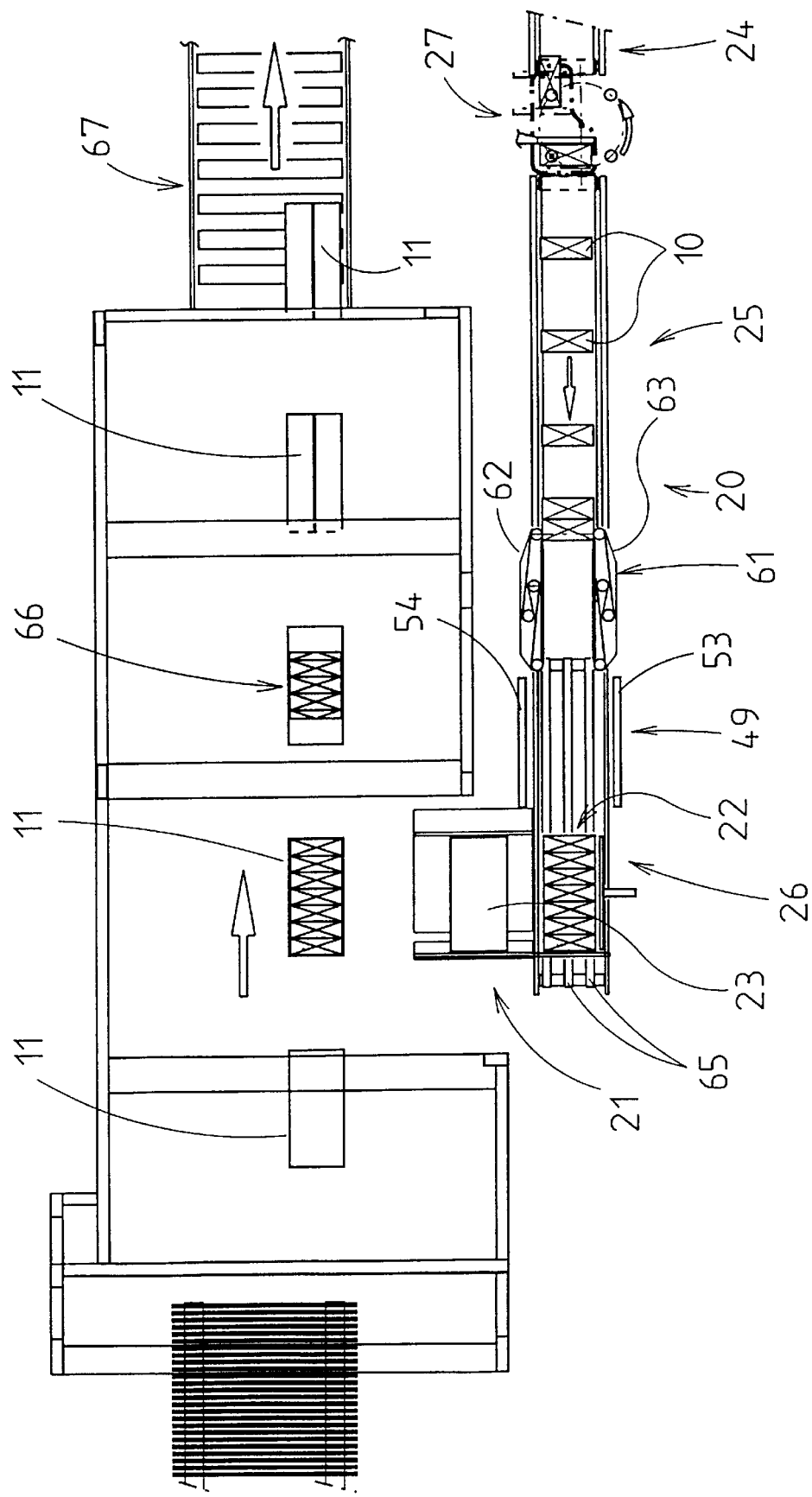
FIG. 3 shows a plan view of the apparatus according to FIG. 2.
Figure 4:
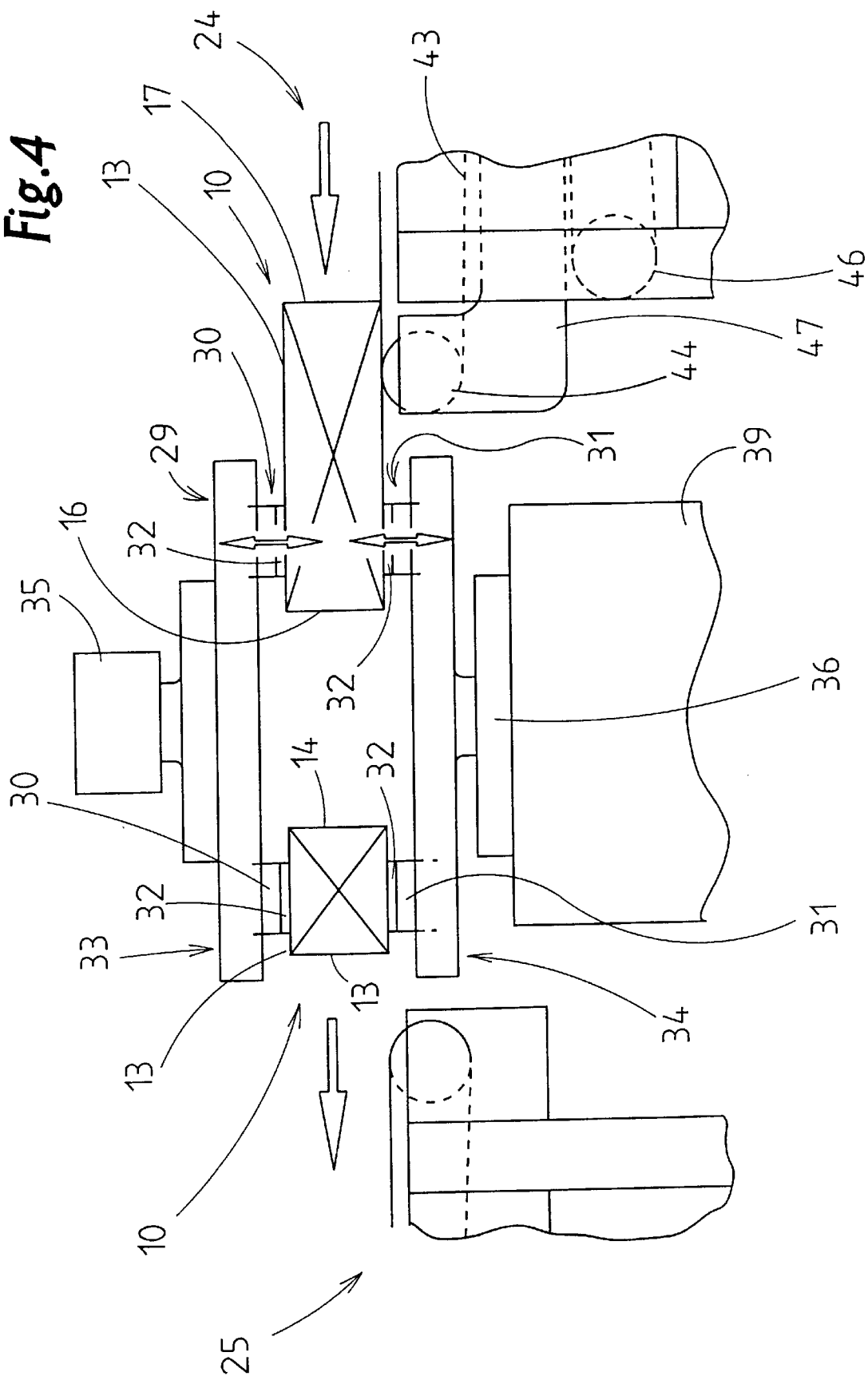
FIG. 4 shows a schematic side view of a detail, namely a turning station for individual packs.

The present exemplary embodiment relates to the handling of a (soft film) pack 10. In specific terms, the invention deals with the operation of packaging individually produced and individually fed packs 10 into a container, namely into a folding box 11. The pack 10 has an elongate, cuboidal configuration and forms a front wall 12, mutually opposite side walls 13 and 14, a rear wall 15, opposite the front wall 12, and an end wall 16 and base wall 17. The pack 10 has an outer wrapper made of a thin film. This forms, in the region of the side walls 13 and 14 in each case, a longitudinal seam 18 for connecting part-walls of the film. A closure seam 19, which is configured as a fin seam, runs in the region of the end wall 16.

The pack 10 may be designed such that in the region of a specific wall, for example in the region of the elongate, rectangular front wall 12, printing is arranged or a label which can be seen from the outside is provided on the inside wall. In this case, the front wall 12 forms the visible side of the pack 10.

The task is for the packs 10, which arise in a specific relative position, to be aligned such that they are suitable for introduction into the folding box 11. Furthermore, the intention is to provide a specific relative position of the packs 10, for example such that the front wall 12 provided with text or a label is directed upwards and, accordingly, can be seen when the box is open.

The packs 10, coming, for example, from a packaging machine (not shown), are fed on a pack conveyor 20 to a packing station 21. In the region thereof, pack groups 22 are formed from a number of packs 10 which are oriented with their longitudinal extension transverse with respect to the conveying direction. A pack group 22 is gripped as a unit by a lifting conveyor 23 and fed to the folding box 11 by transverse transportation and lowered into said box as a layer of packs 10. The lifting conveyor 23 may be designed in a suitable manner, for example in accordance with DE 196 54 041.0.

Figure 5:
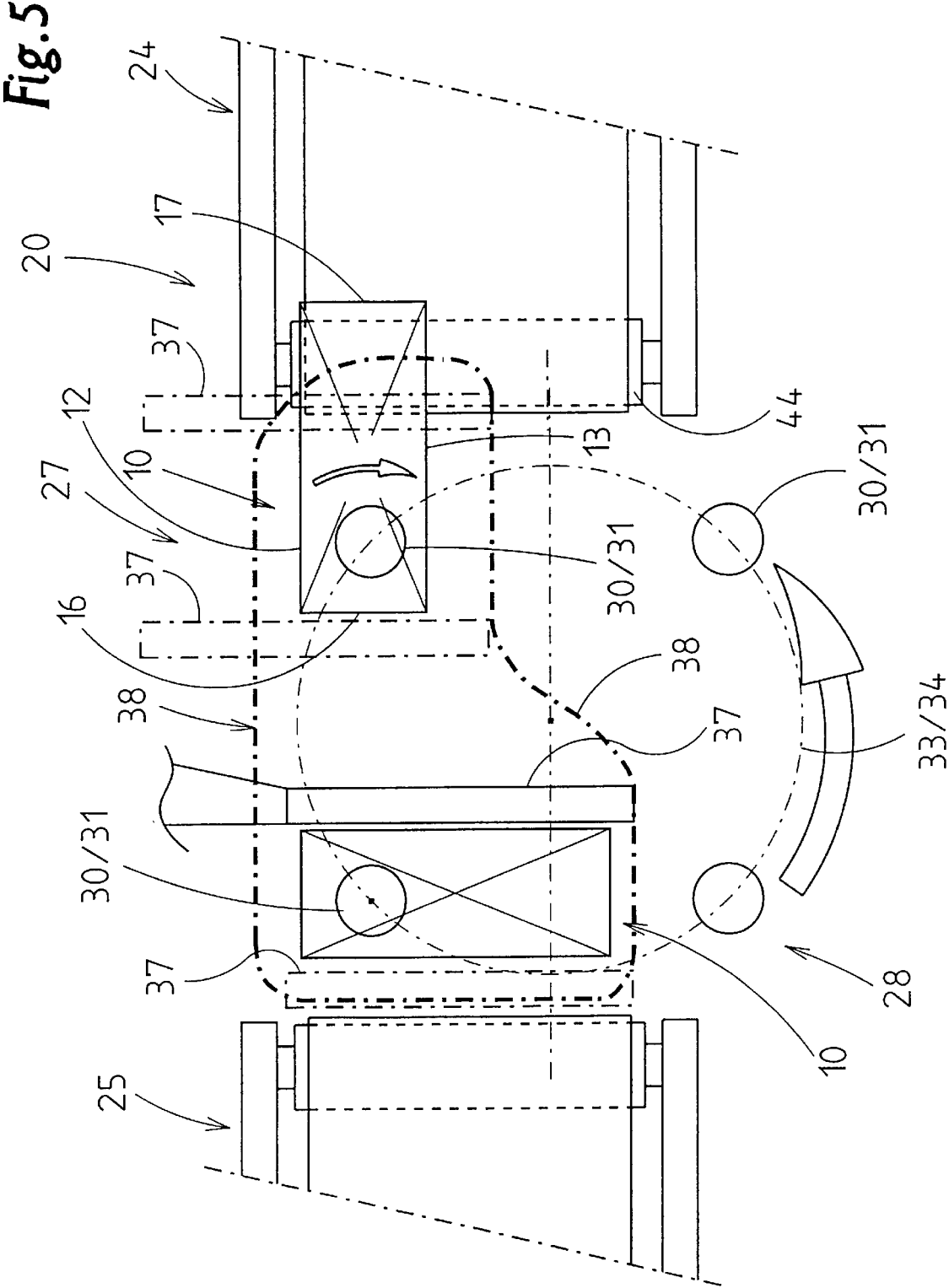
FIG. 5 shows a plan view of the turning station according to FIG. 4.

The pack conveyor 20 is designed as a belt conveyor and is subdivided into a plurality of, namely three, belt sections 24, 25, 26. As a result of production, the packs 10 arrive on the pack conveyor 20, namely the first belt section 24, in a specific relative position. In this region, the packs 10 are positioned with their longitudinal extent oriented in the conveying direction, for example with the end wall 16 at the front in the conveying direction. Moreover, the packs 10 rest against a side border of the belt section 24 (FIG. 5). In the conveying direction, the packs 10 are spaced apart from one another by (approximately) the same distances.

The first belt section 24 leads to a (first) turning station 27. In the region of the same, the packs 10 are rotated about a vertical axis such that, following the turning station 27, the packs 10 are oriented with the longitudinal extent transverse with respect to the conveying direction. The packs 10 are transferred to the next belt section 25 in this relative position—the distance between the packs being maintained in the process.

The turning station 27 has a horizontal turner 28 which grips the packs 10 fed from the belt section 24, transports them along a path in the form of part of a circle and turns them through 90° in the process. The horizontal turner 28 has a plurality of pack-retaining means 29, which are moved along an arc of a circle. These pack-retaining means group the incoming pack 10 essentially in a frictionally locking manner, namely by top and bottom retaining jaws 30, 31, on the top side and underside of the pack 10. During this phase, said pack may be directed with the side walls 13 and 14 in the upward and downward directions, with the result that the retaining jaws 30, 31 butt against said side surfaces 13, 14. In the region of surfaces which butt against the packs 10, the retaining jaws 30, 31 have an elastic bearing means 32. The retaining jaws 30, 31 can be moved in the direction of the packs 10 and, for the purpose of releasing the latter, in the opposite direction, in the present case in the upward and downward directions. Accordingly, the packs 10 are clamped in between the retaining jaws 30, 31.

The retaining jaws 30, 31 are provided on rotatable carrying elements, namely on a top carrying disc 33 and bottom carrying disc 34. Top retaining jaws 30 are arranged on the top carrying disc 33, and upwardly directed bottom retaining jaws 31 are arranged on the bottom carrying disc 34. Each retaining jaw 30, 31 can be moved up and down relative to the carrying disc 33, 34. In the exemplary embodiment shown, four retaining jaws 30, 31 are positioned opposite one another along the circumference of the carrying discs 33, 34. The carrying discs 33, 34 are mounted rotatably in a top rotary bearing 35 and in a bottom rotary bearing 36 and are driven preferably continuously.

The movement of the horizontal turner 28, on the one hand, and the movement of the packs 10, on the other hand, are coordinated with one another such that in the region of the movement path of an incoming pack 10, that is to say in a border region of the belt section 24, a pack-retaining means 29 is held ready with the retaining jaws 30, 31 moved apart. The pack 10 is moved into the position between the retaining jaws 30, 31 by the belt section 24. These retaining jaws are moved into the closed position when an eccentric region of the pack 10 which is at the front in the transporting direction can be gripped (FIG. 5). The horizontal turner 28 is rotated in the anticlockwise direction. The pack-retaining means 29 move in the opposite direction, that is to say they are rotated in the clockwise direction. This gives a movement path which transports the pack 10 from the belt section 24 to the belt section 25, which is arranged at a distance from the belt section 24, and turns said packs through 90° at the same time. At the end of the conveying and turning operation of the horizontal tuner 28, the packs 10 are in precise alignment with the belt section 25, to be precise with the longitudinal extent transverse with respect to the conveying direction. When a pack 10 moved in this way is transferred to the belt section 25, the next pack-retaining means 29 is located in a position for receiving a following pack 10.

The horizontal turner 28 is assigned a further, multifunctional auxiliary element. This is an actuating arm 37 which acts in the region of the movement plane of the packs 10. The actuating arm 37 is positioned outside the turning station 27 and, in the present case, can be moved back and forth exclusively in a translatory manner, that is to say maintaining a transverse position directed transversely with respect to the conveying direction of the packs 10. The actuating arm 37 is moved along a movement path 38, which is illustrated as a chain-dotted line and constitutes the progression of movement of a free end of the actuating arm 37. As an auxiliary element with the functions explained, the actuating arm 37 is only to be seen as a symbolic illustration. In practice, it is possible to provide a plurality of movement-coordinated actuating arms or other elements which are moved in a corresponding manner.

In an initial position—on the right-hand side in FIG. 5—the actuating arm 37 acts as a stop for an incoming pack 10. The latter runs against the actuating arm 37, for example, by way of the end wall 16. This ensures the precise relative position on the respective pack-retaining means 29 which is ready to receive the pack.

The actuating arm 37 is then moved with the pack 10 in the transporting direction, the actuating arm 37 continuing to serve as a stop and, in a central position (FIG. 5), defining the precise relative position of a pack 10 in the region of the pack-retaining means 29, that is to say between the retaining jaws 30, 31.

Thereafter, the actuating arm 37 executes a movement in the conveying direction and, at the same time, a transversely directed displacement into the position shown by solid lines in FIG. 5. In this position, the actuating arm butts against a rear surface, as seen in the conveying direction, of a pack 10 located in front of it, for example against the front wall 12 or rear wall 15. In this position, the actuating arm 37 acts as a pusher which, with the pack-retaining means 29 open, pushes the pack 10 off from the horizontal turner 28 onto the belt section 25. The end position of the actuating arm 37 is marked by chain-dotted lines on the left-hand side in FIG. 5.

In accordance with the movement path 38 in the end position, the actuating arm 37 then executes a transversely directed movement, with the result that the free end of the actuating arm 37 is located outside the movement path of the horizontal turner 28. The actuating arm 37 then returns back into the initial position, as a stop for the next incoming pack 10.

A further special feature is shown in conjunction with the turning station 27, it also being possible for this feature to be used in other turning stations. This special feature involves the operation of the turning station 27 or the horizontal turner 28 being stopped (temporarily). In this case, the packs 10 arriving on the belt section 24 are conveyed further without the relative position being changed.

Figure 6:
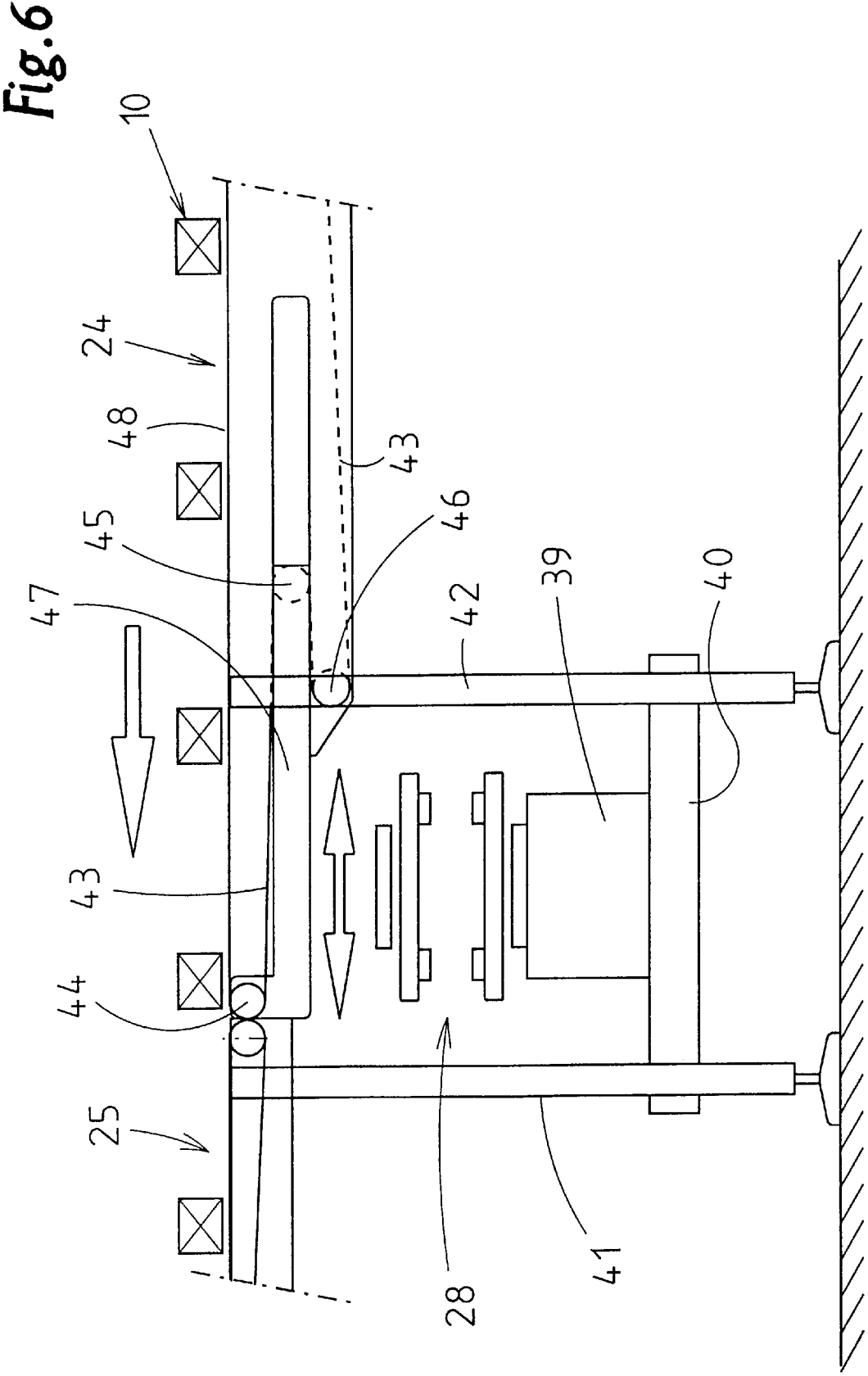
FIG. 6 shows a side view of the turning station according to FIGS. 4 and 5 with the position of individual elements changed.

For this purpose, the horizontal turner 28 can be drawn back out of the movement path of the packs 10. In the exemplary embodiment shown (in particular FIG. 6), the horizontal turner 28 can be lowered as a unit into a position beneath the movement path of the packs 10 or beneath the pack conveyor 20. The horizontal turner 28, or a gear mechanism 39 assigned to it, is arranged on a carrier which can be moved up and down. The latter is a transversely directed crossmember 40. This can be moved up and down on guides. In the present exemplary embodiment, upright supports 41, 42 of a carrying means serves as an upright mount and guide for the crossmember 40.

A further special feature is that, in the lowered position of the horizontal turner 28, the gap produced between the belt sections 24 and 25 can be bridged in a conveying-specific manner. For this purpose, the belt section 24 can be extended telescopically until the belt section 24 adjoins the belt section 25 directly. For this purpose, a bottom band 43 of the belt section 24 is routed in the form a loop, namely over an end roller 44, an intermediate roller 45 and a bottom, deflecting roller 46. This roller—deflecting roller 46—is in a fixed position, for example on the support 42. The end roller 44 and the intermediate roller 45 can be retracted and extended, the shape and size of the loop formed by the bottom band 43 being changed in the process. For this purpose, the two rollers 44 and 45 are arranged on a carriage-like, common carrier 47. The latter is designed in this case in angled form. The end roller 44 is provided on an upwardly directed leg of the carrier 47, with the result that, in the region of a top strand 48, the belt section 24 and belt section 25 run in a common plane. In order to bridge the gap, the carrier 47 is extended in the direction of the belt section 25, the rollers 44 and 45 being carried along in the process. As a result, the top strand 48 is lengthened correspondingly until the belt section 24 adjoins the belt section 25.

A further turning station 49 is provided in the region of the belt section 26. This turning station 49 is provided with a vertical turner 50. The task of the turning station 49 or of the vertical turner 50 is to change the relative position of the pack 10 again. Said pack is rotated about its own longitudinal axis such that, for example, the longitudinal seam 18, which has been directed in the upward and downward directions during the preceding transportation, is directed sideways and the front wall 12, provided for example with printing or the like, is oriented upwards.

For this purpose, the incoming packs 10 are gripped, in the region of the belt section 26, on the sideways-directed surfaces, that is to say on the end wall 16 and base wall 17, and are rotated through 90°, to be precise about an axis of rotation oriented transversely with respect to the conveying direction. At the same time, the packs 10 are conveyed from a receiving position into a set-down position by the vertical turner 50.

The incoming packs 10 are gripped and rotated by pairs of side retaining means 51, 52 acting on mutually opposite sides—end wall 16, base wall 17. The side retaining means 51, 52 are equipped as suction elements and, moreover, can be retracted and extended in the direction of the pack 10 and in the opposite direction.

In order to grip a pack 10, the two mutually opposite side retaining means 51, 52 are extended until they butt against the pack surfaces directed towards them. The side retaining means 51, 52, or the abutment surfaces directed towards the packs, are subjected to suction action, with the result that, on the one hand, the packs 10 are clamped in—with slight pressure—between the side retaining means 51, 52 but, on the other hand, they are also fixed on the side retaining means 51, 52 by suction. For compliant abutment against the, for example, soft packs 10, the side retaining means 51, 52 are designed as folding bellows, that is to say in an elastically compliant manner.

The retaining elements for the packs 10 in the region of the vertical turner 50, that is to say the side retaining means 51, 52, are provided on lateral, upright carrying elements, to be precise on upright rotary discs 53, 54. These are of circular design and are mounted laterally alongside the movement path of the packs, or alongside the belt section 26, and are driven preferably continuously in rotation. The side retaining means 51, 52 are fastened indirectly on the rotary discs 53, 54, that is to say by carrying elements, to be precise carrying levers 55, 56. These are mounted rotatably on the respective rotary disc 53, 54.

In the present exemplary embodiment, the elongate, rectangular carrying levers 55, 56 are mounted on the rotary disc 53, 54 by way of a rotary bearing 57 which is arranged eccentrically, that is to say in an offset manner. Furthermore, in each case one further side retaining means 58, 59 is mounted on each carrying lever 55, 56. In each case one of the side retaining means 51, 52 is provided in the region of the rotary bearing 57 of the carrying lever 55, 56. The other side retaining means 58, 59 are positioned in an offset manner with respect to the first, that is to say at a distance from the rotary bearing 57. The additional, or second, side retaining means 58, 59 are used in the case of appropriately wide packs or in the case of large-format packs, which cannot be gripped by in each case one side retaining means 51, 52 alone.

Figure 7:
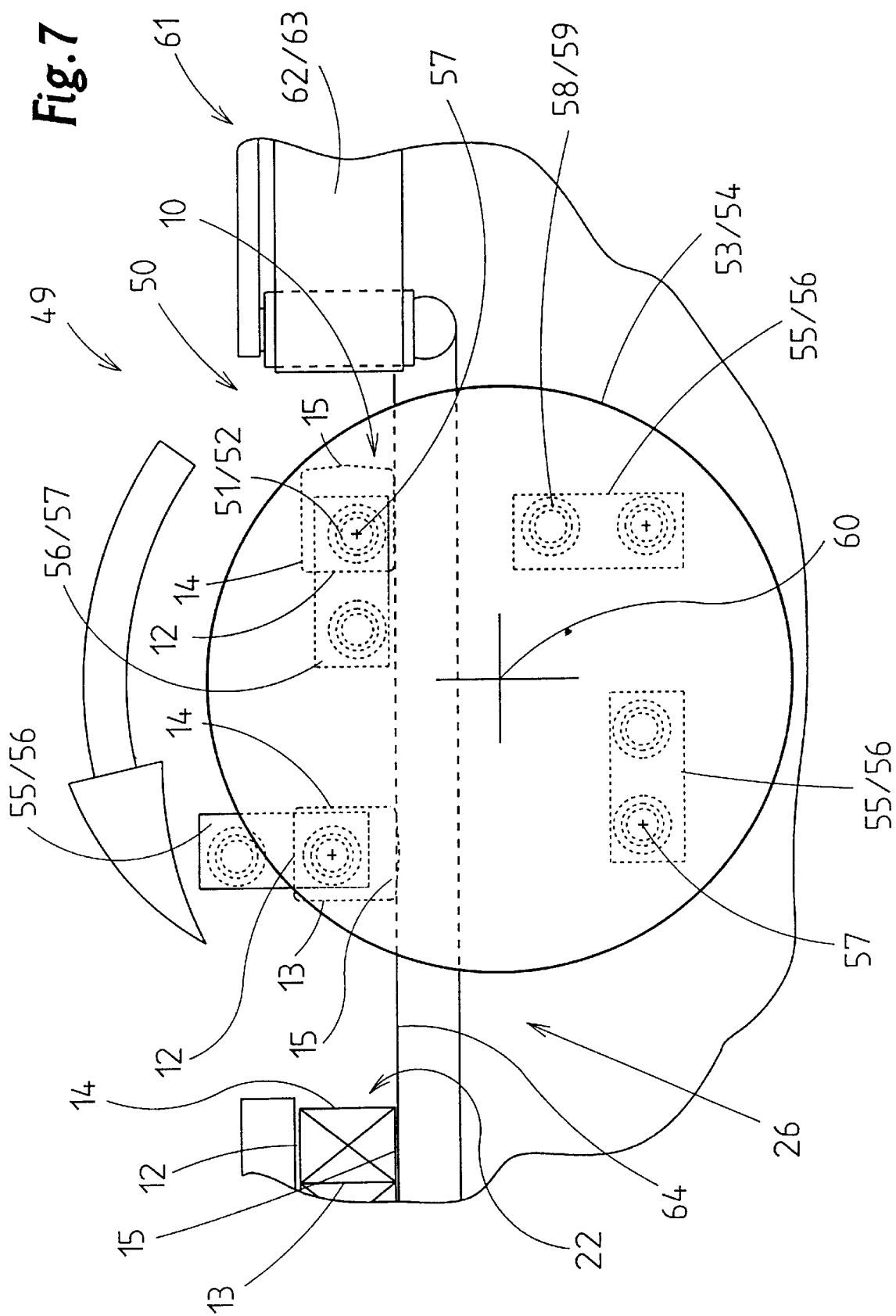
FIG. 7 shows a side view of a further turning station for individual packs.
Figure 8:
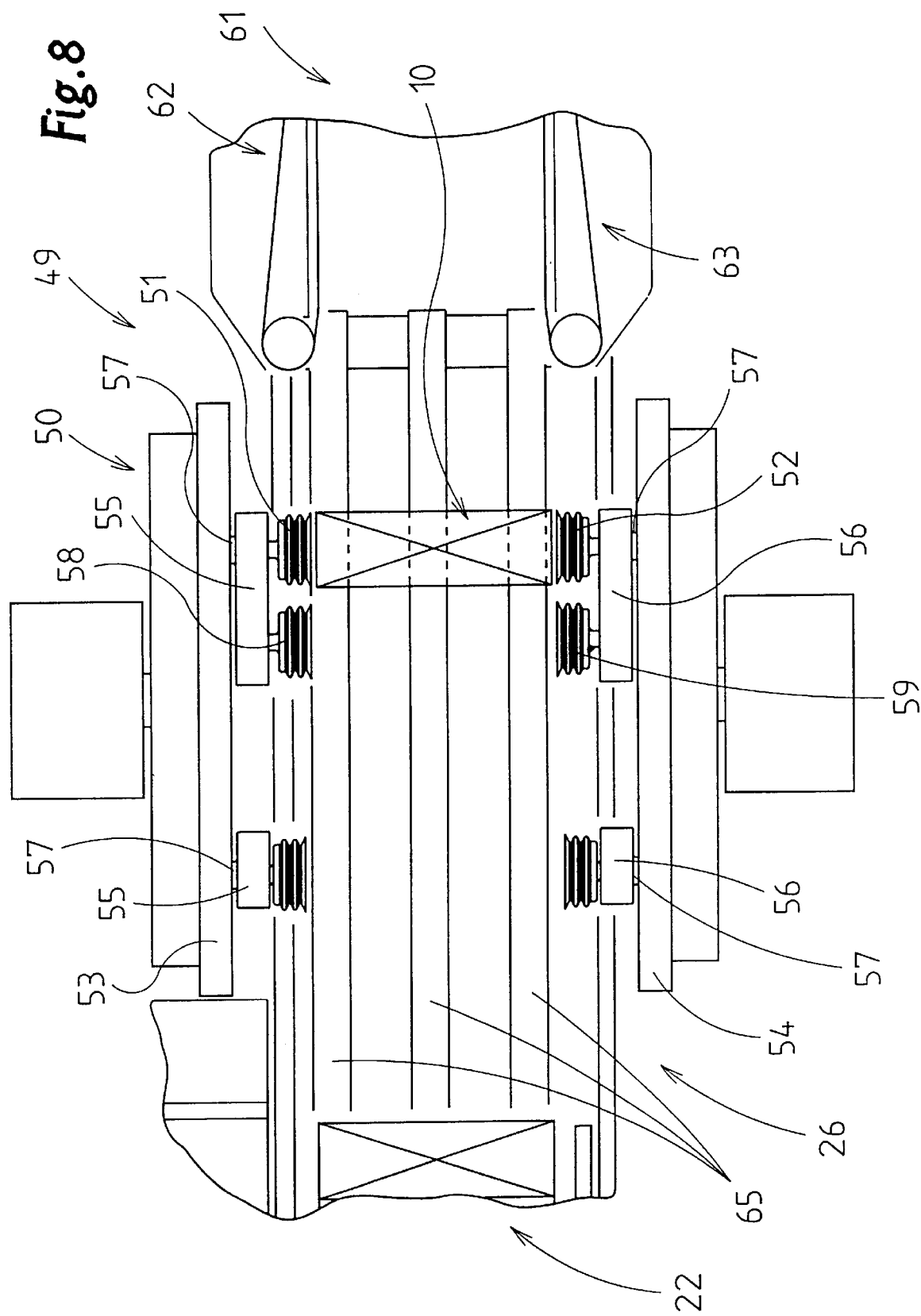
FIG. 8 shows a plan view of the detail according to FIG. 7.

The rotary discs 53, 54 are rotated in the anticlockwise direction according to FIG. 7. An axis of rotation 60 of the two rotary discs 53, 54 is located beneath the conveyor for the packs 10, that is to say beneath the belt section 26. Side retaining means 51, 52 in the top part of the rotary discs 53, 54 grip a fed pack 10 on the sideways-directed surfaces. As the rotary discs 53, 54 move further, a corresponding drive—for example a planet gear mechanism—rotates the carrying levers 55, 56, and thus the side retaining means 51, 52, in the clockwise direction relative to the rotary discs 53, 54. The movements are coordinated with one another such that a pack surface which was originally directed to the rear in the conveying direction, for example a rear wall 15, is oriented downwards and butts against the belt section 26, while the front wall 12, which was originally directed forwards, is oriented upwards. In this relative position, the packs 10 are fed to a collector station, in which the pack group 22 is formed from a plurality of packs 10 located one beside the other, each with the front wall 12 directed upwards. This pack group 22 is then introduced into the folding box 11.

Before the transfer to the turning station 49 or to the vertical turner 50, the packs 10 are controlled such that a pack 10 can be transferred to side retaining means 51, 52 at a precise point in time. For this purpose, the turning station 49 is assigned an accumulation station. In the region thereof, the packs are stopped briefly and connected in a closely packed arrangement. The respectively front pack 10 is released in coordination with the vertical turner 50. The accumulation element provided is an accumulation conveyor 61 which comprises two lateral conveying belts 62, 63. The latter or the conveying strand thereof, said strand being directed towards the packs 10, and/is driven at the somewhat lower speed than the preceding conveyor, that is to say then the belt section 25. As a result, the packs 10 are collected in a closely packed arrangement. The packs are transferred individually to the belt section 26 from the accumulation conveyor 61.

A further special feature is that the belt section 26 is designed as a suction conveyor. In the region of the belt section 26, the packs 10 are drawn against a top conveying strand 64 by suction force and/or negative pressure. Furthermore, the belt section 26 comprises a plurality of individual bands 65 located one beside the other. Preferably, each individual band 65 is designed as a suction belt with a suction box (not shown) which is arranged beneath the conveying strand 64 and draws suction air via the conveying strand 64, which is designed to be air-permeable. The packs 10 are thus retained precisely on the belt section 26. In the region of the pack group 22, the individual bands 65 continue with slipping action beneath the accumulated packs 10.

The entire apparatus, including the two turning stations 27, 49 and the elements thereof, is driven preferably continuously. In terms of movement sequences, the individual elements of the turning stations are coordinated with one another and with the conveying movement of the packs.

The folding boxes 11 filled with the pack groups 22 in the manner described are transported on a folding-box path 66 parallel to the belt section 24, 25, 26, to be precise in the opposite direction. After the folding boxes 11 have been closed, they are transferred to a roller path 67, which conveys the completed, closed folding boxes 11, for example, to a palleting station.

LIST OF DESIGNATIONS

10 Pack
11 Folding box
12 Front wall
13 Side wall
14 Side wall
15 Rear wall
16 End wall
17 Base wall
18 Longitudinal seam
19 Closure seam
20 Pack conveyor
21 Packing station
22 Pack group
23 Lifting conveyor
24 Belt section
25 Belt section
26 Belt section
27 Turning station
28 Horizontal turner
29 Pack-retaining means
30 Retaining jaw
31 Retaining jaw
32 Bearing means
33 Carrying disc
34 Carrying disc
35 Rotary bearing
36 Rotary bearing
37 Actuating arm
38 Movement path
39 Gear mechanism
40 Crossmember
41 Support
42 Support
43 Bottom band
44 End roller
45 Intermediate roller
46 Deflecting roller
47 Carrier
48 Top strand
49 Turning station
50 Vertical turner
51 Side retaining means
52 Side retaining means
53 Rotary disc
54 Rotary disc
55 Carrying lever
56 Carrying lever
57 Rotary bearing
58 Side retaining means
59 Side retaining means
60 Axis of rotation
61 Accumulation conveyor
62 Conveying belt
63 Conveying belt
64 Conveying strand
65 Individual band
66 Folding-box path
67 Roller path

What is claimed is:

1. A process for handling packs (10), which comprises:
   a. conveying the packs (10) which are at a distance from one another on a pack conveyor (20) and feeding the packs to a pack station (21);
   b. rotating the packs about a horizontal axis, said horizontal axis extending transversely to the conveying direction of the pack conveyor (20), prior to reaching pack station (21) in the region of turning station (49); and
   c. gripping the packs (10) individually on mutually opposing sides thereof and lifting and rotating the packs (10) about the horizontal axis and then setting them down.

2. The process according to claim 1, wherein the packs are rotated through 90°.

3. The process according to claim 1, wherein the packs (10) are gripped and lifted by suction holders.

4. The process according to claim 3, wherein the packs (10) are gripped and lifted by mechanical pressure exerted on opposite sides of the packs.

5. The process according to claim 1, wherein the packs (10) have a cuboid shape and a longitudinal extent oriented transversely to the conveying direction of the pack conveyor (20), and the corresponding end faces each lie facing the outside, and the packs (10) are gripped on the end faces and rotated about the horizontal axis which extends transversely to the conveying direction of the pack conveyor 20.

6. The process according to claim 5, wherein the packs (10) are rotated about a horizontal rotational axis (60) transverse to the conveying direction which lies below the conveying plane of the pack conveyor (20).

7. The process according to claim 6, wherein each pack (10) is simultaneously rotated about its longitudinal axis in the same direction or in the opposite direction so that the sum of the two superimposed rotational movements result in a smaller or greater rotation including a reverse rotation, than rotation about the horizontal rotational axis (60) only.

8. The process according to claim 1, wherein prior to being gripped and rotated, the packs (10) are conveyed on the pack conveyor (20) at a lesser speed than at all other times, whereby the packs (10) back-up before the turning station (49) and are then transferred individually and precisely to the turning station (49).

9. The process according to claim 1, whereby the pack groups (22) are formed in the pack station (21) from a number of packs (10), conveyed away as a unit, and then lowered into a container (11).

10. Apparatus for handling packs (10), which comprises:
    a. the packs (10) which are at a distance from one another are conveyed on a pack conveyor (20);
    b. a turning station (49) in the region of the pack conveyor (20) is provided for rotating the packs about a horizontal axis;

c. the turning station (49) having a vertical turner (50) which is provided with rotating carrying elements for the packs; and d. the rotating carrying elements containing lateral side retaining means (51, 52, and 58, 59), which are arranged outside the movement path of the packs (10), for gripping the packs (10) on mutually opposite, laterally directed surfaces thereof.

11. The apparatus according to claim 10, wherein the lateral side retaining means (51, 52 and 58, 59) grip the packs (10) in the region of an end wall (16) and a base wall (17) opposite thereto, said packs (10) arranged with their longitudinal extent disposed transversely to the conveying direction of the pack conveyor (20).

12. The apparatus according to claim 10, wherein the lateral retaining means (51, 52 and 58, 59) are moved toward each other to grip the packs (10) and away from each other to release the packs (10).

13. The apparatus according to claim 10, wherein the lateral retaining means hold the packs (10) by means of suction.

14. The apparatus according to claim 10, wherein the lateral retaining means are arranged on lateral, upright rotary discs (53, 54), which have a horizontal rotational axis (60) transverse to the pack conveyor (20).

15. The apparatus according to claim 14, wherein the rotational axis (60) lies below the conveying plane of the pack conveyor (20).

16. The apparatus according to claim 14, wherein the lateral retaining means rotate in their own rotary bearings (57) relative to the rotary discs (53, 54) in such a manner that the rotation of the packs (10) is established by superimposing the rotation of the lateral retaining means and the rotary discs.

17. The apparatus according to claim 16, wherein the rotational movement of the lateral retaining means and the rotary discs are coordinated with each other in such a way manner that a wall of each pack (10) which initially faces the front in the conveying direction is directed upwards after the rotation operation.

18. The apparatus according to claim 14, wherein two lateral retaining means (51, 52 and 58, 59) are arranged on a common carry lever (56, 57), and the carrying levers on the rotary discs (53, 54) can be rotated about an axis parallel to the rotational axis (60) of the rotary discs.

19. The apparatus according to claim 10, wherein a collecting station is located downstream of the turning station (50) along pack conveyor (20) in which a plurality of packs (10) lying adjacent to one another forms a pack group (22) and downstream of the collecting station is a pack station (21) in which pack groups (22) are introduced into a container ready to receive them.

20. The apparatus for handling packs (10), which comprises:

a. the packs (10) which are at a distance from one another are conveyed on a pack conveyor (20) to the region of a collecting and pack station (21) and consolidated into pack groups (22) and introduced into a container (11) ready to receive them;

b. the pack conveyor (20) having a turning station (27, 49) in which the packs (10) are rotated about a horizontal or a vertical axis;

c. the turning station (27, 49) can be moved relative to the movement path of the packs (10) on the pack conveyor (20) between a first position for rotating the packs (10) and a second position which is lower relative to the first position; and d. the pack conveyor (20) has, in the region of the turning station (27, 49), an intermediate conveyor, which bridges the conveying gap created by the turning station in its second, lowered position.

21. The apparatus according to claim 20, wherein the intermediate conveyor is a belt loop of a belt section (24) of the pack conveyor (20), and said belt loop formed by two deflecting rollers (44) on a common carrier (47), the carrier (47) being moved in the direction of the pack conveyor (20) in order to extend the belt section (24) and to bridge the second, lowered position of the turning station.

* * * * *